United States Patent Office 2,816,147
Patented Dec. 10, 1957

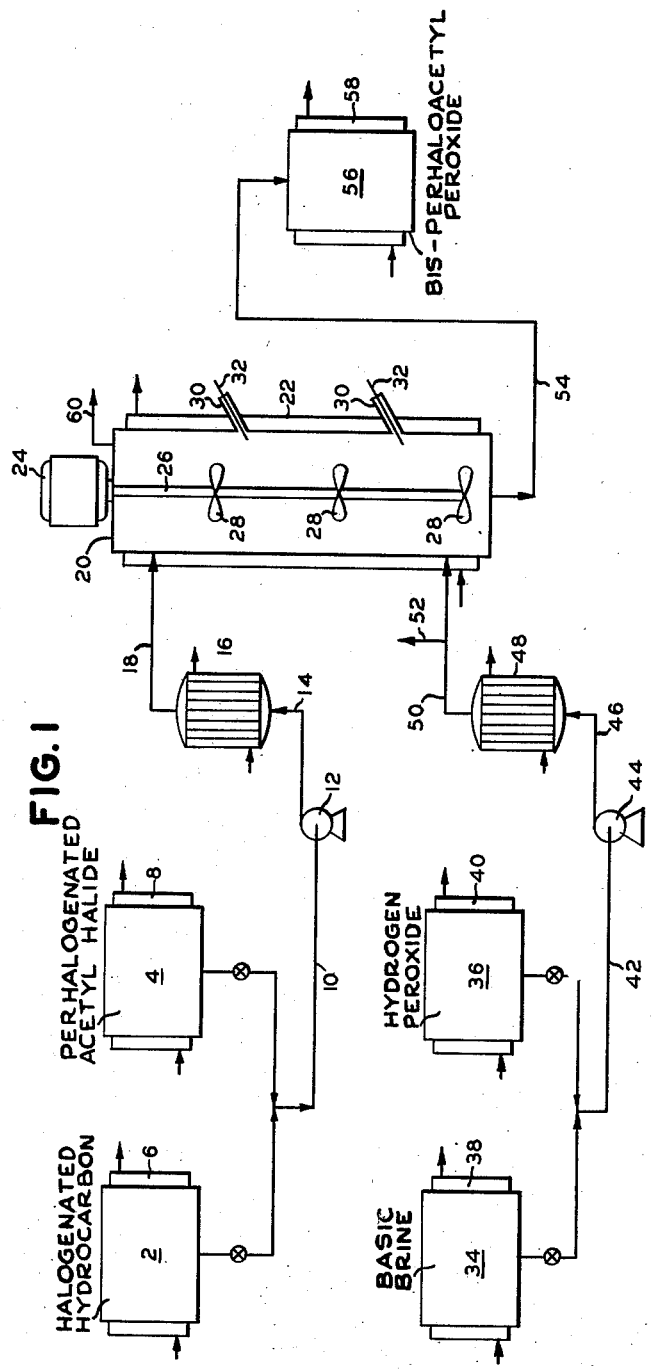
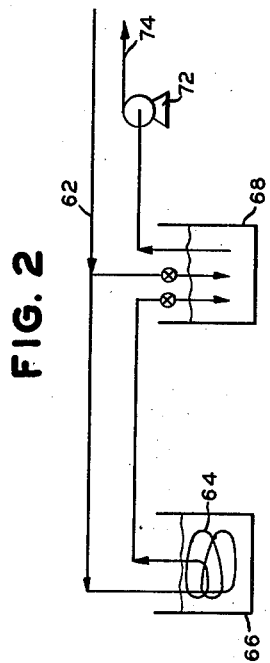

2,816,147
PREPARATION OF PERHALOACETYL PEROXIDES

Charles W. Weber, Jersey City, and William S. Barnhart, Cranford, N. J., assignors, by mesne assignments, to Minnesota Mining and Manufacturing Company, St. Paul, Minn., a corporation of Delaware Application March 7, 1955, Serial No. 492,442

11 Claims. (Cl. 260—610)

This invention relates to a process for the continuous preparation of perhaloacetyl peroxides and, more particularly, to a continuous process for the preparation of bis-trichloroacetyl peroxide.

Perhaloacetyl peroxides, such as bis-trichloroacetyl peroxide, are useful as polymerization promoters and are particularly efficacious in the polymerizaion of perhalogenated ethylenes, such as chlorotrifluoroethylene and tetrafluoroethylene. Since these peroxides contain no hydrogen, fragments of the promoter that may be incorporated in the polymeric product do not diminish the stability of the polymer or its ability to resist chemical attack by halogens or halogenated compounds. When perhalogenated olefinic monomers are polymerized in the presence of these peroxides as promoters, polymers are produced which have exceptional stability.

Perhaloacetyl peroxides, such as bis-trichloroacetyl peroxide, have previously been prepared in a batch process in which sodium peroxide is suspended in a 20 percent brine solution and is contacted with trichloroacetyl chloride for a period of one to three minutes at a temperature of about —15° C. The organic peroxide is extracted with trichlorofluoromethane, separated, and stored cold as a solution. The general reaction is as follows:

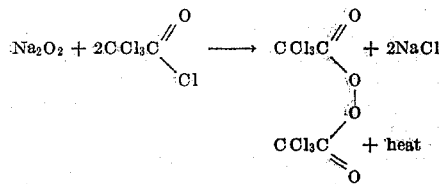

Several side reactions can also occur as follows:

$Na_2O_2 + H_2O \rightleftharpoons NaOH + H_2O_2 + heat$

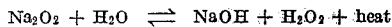

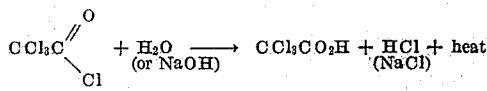

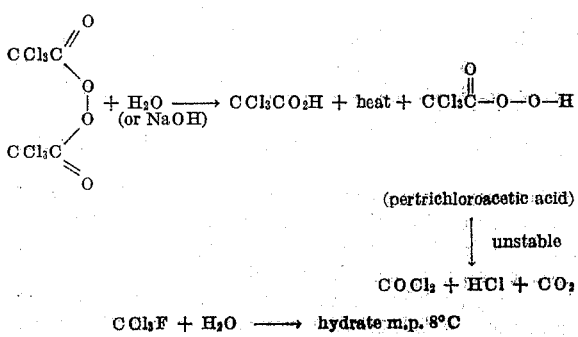

The average yield of organic peroxide produced by the batch process is about 60 to 65 percent of the theoretical yield and the trichlorofluoromethane solution contains some trichloroacetyl chloride. The brine layer is usually acidic, and contains peroxide, inorganic or organic, both properties being highly variable.

A clear solution of sodium peroxide in brine can be prepared at 0° C. with evolution of heat but with a loss of 30 to 50 percent of the peroxide activity. Once made, this solution is stable for a period of hours. However, an analogous solution can be readily prepared by adding 30 percent liquid hydrogen peroxide to aqueous brine, made basic by the addition of a base such as sodium hydroxide, without the evolution of heat or the loss of peroxide. This solution is also stable for a period of hours. Hence, in the present invention a mixture of hydrogen peroxide in basic brine solution is used instead of sodium peroxide in an ordinary brine solution.

The process of the present invention is performed in a reactor using a counter-current flow of a stream of a perhalogenated acetyl halide admixed with a halogenated hydrocarbon, such as trichlorofluoromethane, to a stream of hydrogen peroxide in basic brine. This reaction may conveniently be performed in a tower in which a mixture of hydrogen peroxide in basic brine is introduced near the bottom of the tower, and a mixture of trichloroacetyl chloride in trichlorofluoromethane is introduced at the top of the tower. A product mixture of bis-trichloroacetyl peroxide and trichlorofluoromethane is removed near the bottom of the tower as a product of the process, while aqueous brine is removed as an overhead fraction and passed to a waste disposal. The temperature in the reaction zone is maintained between 0° C. and the freezing temperature of the reaction mixture, which is about —20° C. Generally, the reaction temperature should be controlled within the range of about —5 to —20° C.

The perhalogenated acetyl halide which may be used in the process of the present invention may be a compound such as trichloroacetyl chloride, trifluoroacetyl fluoride, and the like, and this compound is dissolved in a halogenated hydrocarbon, such as trichlorofluoromethane, to give a 0.4 to 1.0 molar solution. The basic brine solution, with which the perhalogenated acetyl halide is reacted, is preferably saturated at the reaction temperature and may contain as much as 20 percent by weight of sodium chloride. In addition, the solution should be made about 0.1 to 3.0 molar in a base, such as sodium hydroxide, and about 0.3 to 1.0 molar in hydrogen peroxide. Good results have been obtained using an aqueous brine solution, containing 20 percent by weight of sodium chloride, which is 0.2 to 1.0 molar in sodium hydroxide, and 0.2 to 0.7 molar in hydrogen peroxide.

The perhalogenated acetyl halide is reacted with a sufficient quantity of a solution of basic brine and hydrogen peroxide so that a stoichiometric excess of hydrogen peroxide is present during the reaction. Generally, a 0 to 500 percent excess of hydrogen peroxide is used. Good results have been obtained using an excess of hydrogen peroxide ranging from 10 percent to 100 percent. The contact time may be 3 to 60 minutes, preferably 8 to 12 minutes.

Referring to the accompanying drawings in which a flow diagram for the process of the present invention is shown:

Figure 1 is a flow diagram showing the basic elements of the process but eliminating certain valves and the like, the use of which will be obvious to those skilled in the art, and Figure 2 discloses one embodiment of the method employed to cool the heat transfer medium used in the process.

Referring to Figure 1 of the drawing, tanks 2 and 4 having the jackets 6 and 8, respectively, thereon are feed tanks containing a mixture of a halogenated hydrocarbon, such as trichlorofluoromethane, and a perhalogenated acetyl halide, such as trichloroacetyl chloride. This mixture is maintained at a temperature below 0° C. and transferred by means of a conduit 10, the pump 12, and the conduit 14 to the heat exchanger 16, where the mixture is further cooled to the reaction temperature which may be about −5 to −20° C. The mixture is then transferred through the conduit 18 to the reactor-extractor tower 20 and is introduced into this tower at a point adjacent the top thereof. The tower 20 is also provided with a jacket 22, whereby a heat transfer medium may be passed through the jacket to maintain the reaction temperature in the desired range. The reactor-extractor is also provided with a motor 24 mounted on the top thereof having a shaft 26 connected thereto, the shaft having a plurality of propellers or other agitators 28 mounted thereon to insure intimate mixing of the reactants in the tower. The tower 20 is also provided with a plurality of thermocouple wells 30 having the thermocouples 32 mounted therein. The thermocouples 32 are connected by means of wires, not shown, to suitable recording instruments, not shown, for measuring the temperature within the tower 20.

The tanks 34 and 36, having the jackets 38 and 40, respectively, thereon contain a feed mixture of basic brine and hydrogen peroxide, this feed mixture being passed through the conduit 42, the pump 44, and the conduit 46 to heat exchanger 48, where the temperature of the mixture is further lowered to the reaction temperature in the tower 20. The mixture is then passed through the conduit 50 to the tower 20 and is introduced at a point adjacent the bottom of the tower. A vent tube 52 is connected to the conduit 50 to prevent a vapor lock in this conduit due to the slow decomposition of hydrogen peroxide into water and oxygen.

As the feed mixture of hydrogen peroxide in basic brine is introduced into the bottom of the tower and the feed mixture of trichloroacetyl peroxide and trichlorofluoromethane is introduced into the top of the tower 20, a reaction occurs resulting in the formation of bis-trichloroacetyl peroxide, good agitation being essential to produce high yields of product. The bis-trichloroacetyl peroxide product is removed from the tower 20 through the conduit 54 as a mixture with trichlorofluoromethane, this mixture being passed to the product receiver 56 having the jacket 58 thereon, where it is maintained as a solution until it is used. This peroxide is reported to show the explosive force of nitroglycerin, plus extreme sensitivity to heat and shock; therefore, utmost care must be taken at all times in handling this material. Aqueous brine is removed overhead from the tower 20 through the conduit 60, where it is passed to a sewer or other waste disposal.

Referring to Figure 2 of the drawings, a system is shown for cooling the heat exchange medium, which may be any liquid having a sufficiently low freezing point such as methyl alcohol, acetone, a 60–40 mixture of ethylene glycol and water, trichloroethylene, or carbon tetrachloride. This system cools the heat transfer medium which is circulated in the jackets on the feed tanks, the heat exchangers, the jacket on the reactor-extractor and the jacket on the product receiver.

The return conduit 62 returning the heat exchange medium for cooling is divided, and one portion of the heat exchange medium passes through the coil 64 which is immersed in a cooling bath in the tank 66, the cooling bath being maintained at a temperature of −70° C. with solid carbon dioxide. The heat exchange medium in the tank 68 is maintained at a temperature sufficiently low to provide the desired reaction temperature in the tower 20 and may be at a temperature in the range of −5 to −20° C. The cooled heat exchange medium is then transferred by means of the conduit 70, the pump 72, and the conduit 74 to the jackets on the heat exchangers, the tower 20, and the various tanks.

Instead of the trichlorofluoromethane which is mixed with the trichloroacetyl chloride, other halogenated hydrocarbons may be used, such as trichlorotrifluoroethane, carbon tetrachloride, chloroform, and dichlorofluoromethane.

The invention will be further illustrated by reference to the following specific example:

EXAMPLE 1

Bis-trichloroacetyl peroxide was prepared using a reactor 4.5 feet in height fabricated from 12 mm. inside diameter glass tubing and using a 7 mm. outside diameter glass rod for stirring. The stirring rod, without bearings, hung from a motor and rotated from 400 to 600 revolutions per minute. The volumes of the top separation zone, reaction zone, and bottom separation zone were 35 ml., 85 ml., and 20 ml., respectively.

The operating procedure was as follows: The coolant was circulated and adjusted to a temperature of −15° C., and blank solvents, i. e., trichlorofluoromethane and basic brine, were pumped to the reactor-extractor, the feed rates being adjusted as desired. The agitator was started and adjusted so that the mixing zone was above the brine inlet. The feed was then switched to active solvents and run for a period of one-half to one hour to replace the blank solvents in the system.

The run was then started and both basic brine and trichlorofluoromethane effluents were collected. Grab samples were obtained and analyzed as desired. The run was stopped by switching to blank solvents for a period of one-half to one hour; the reactor effluents were weighed and analyzed.

The results of the various runs are summarized in the table below. Inadequate mixing of reactants or inadequate contact time appeared to be the principal hindrances to maximum peroxide yields.

Stirrer design was also considered, and a stirrer consisting of two 3 mm. outside diameter glass rods, placed in parallel to form a figure 8 surface, showed better mixing than a single rod. Runs 3 and 4 (reaction volume=107 ml.) suggested too much contact was resulting in excessive hydrolysis of the trichloroacetyl chloride. By lowering the alkali concentration in runs 5 and 6, yields were improved and hydrolysis of unreacted trichloroacetyl chloride was minimized.

The effect of increased contact time in a larger reactor having a diameter of 20 mm. and reaction volume of 187 ml. is shown in runs 7 and 8 to result in a maximum yield of 68.8 percent by weight of peroxide product. However, a change in the stirrer was necessary with the larger diameter reactor, the stirrer used being a 7 ml. outside diameter glass tube having polyethylene vanes mounted thereon at 4-inch intervals throughout the reaction zone.

Table.—Continuous synthesis of bis-trichloroacetyl peroxide

| Experiment No. | Run time, min. | CCl₃F | | Brine | | | | Contact time, min. | Stirring rate, volts |
|---|---|---|---|---|---|---|---|---|---|
| | | CCl₃COCl₃, Mole | Rate, ml./min. | H₂O₂, mole | NaOH, M | Rate, ml./min. | Excess, H₂O₂ percent | | |
| 1 | 60 | 1.05 | ᵃ 4.0 / ᵇ 3.8 | 0.441 | 0.8 | ᵃ 8.0 / ᵇ 7.8 | 68 | 8.9 | 95 |
| 2 | 120 | 0.98 | ᵃ 4.1 | 0.36 | 0.8 | ᵃ 9.04 | 66 | 8.1 | 95 |
| 3 | 195 | 0.90 | ᵃ 5.6 / ᵇ 3.54 | 0.481 | 0.8 | ᵃ 10.7 / ᵇ 9.67 | 104 | 6.6 | 90 |
| 4 | 60 | 0.854 | ᵃ 3.63 | 0.456 | 0.8 | ᵃ 11.45 | 237 | 7.1 | 80 |
| 5 | 69 | 0.917 | ᵃ 6.8 / ᵇ 4.7 | 0.422 | 0.4 | ᵃ 9.76 / ᵇ 9.76 | 32 | 6.5 | 80 |
| 6 | 135 | 0.968 / 1.06 | ᵃ 6.94 / ᵇ 4.94 / ᵃ 4.18 / ᵇ 4.15 | 0.414 | 0.6 | ᵃ 9.65 / ᵇ 10.15 | 9.05 | 7.7 | 82 |
| 7 | 150 | 0.927 | ᵃ 6.76 / ᵇ 5.04 | 0.488 | 0.8 | ᵃ 10.07 / ᵇ 11.1 | 55 | 11.1 | 78 |
| 8 | 125 | 0.874 | ᵃ 7.1 / ᵇ 4.5 / ᶜ 2.5 | 0.459 | 0.8 | ᵃ 9.0 / ᵇ 9.7 | 33 | 11.6 | 72 |

| Experiment No. | Temp. range, °C. | Peroxide Solution | | | | Spent Brine | | |
|---|---|---|---|---|---|---|---|---|
| | | (RCO)₂O₂, M | Yield, Percent | CCl₃COCl, M | Recovered, Percent | H₂O₂, M | pH | Stirrer Type |
| 1 | −10 to −15 | 0.195 | 37.1 | 0.534 | 50.7 | present | >11 | rod. |
| 2 | −10 to −15 | 0.197 | 40.5 | 0.464 | 47.3 | do | >11 | Do. |
| 3 | −10 to −15 | 0.239 / final grab → 0.183 | 27.3 / 53.1 | 0.227 | 25.2 | do | >11 | oper. troubles. (fig. 8.) |
| 4 | −17 to −20 coolant | 0.183 | 42.8 | 0.118 | 13.4 | do | >11 | Do. |
| 5 | −20 coolant | 0.255 | 55.6 | 0.415 | 45.2 | 0.193 | 4.0 | Do. |
| 6 | −20 to −25 coolant | 0.316 / 0.316 / 0.280 / 0.280 | 65.3 / 65.3 / 52.8 / 52.8 | 0.352 / 0.258 / 0.248 | 36.3 / 24.3 / 23.4 | 0.190 | >11 | Do. |
| 7 | −14 | 0.29 / 0.319 | 62.6 / 68.8 | 0.09 / 0.106 | 9.7 / 11.4 | present | 6 | 7 mm. O. D. rod and polyethylene vanes. |
| 8 | −14 | 0.319 / 0.294 | 68.8 / 67.2 | 0.342 | 39 | 0.176 | >10 | as in 7. |

ᵃ From feed tank readings.
ᵇ From measured volume of reactor effluent.
ᶜ CCl₃F carried out with spent brine.

It will be obvious to those skilled in the art that many modifications may be made within the scope of the present invention without departing from the spirit thereof, and the invention includes all such modifications.

We claim:

1. A process for the continuous preparation of a perhaloacetyl peroxide which comprises continuously countercurrently contacting in a contacting zone a mixture of an inorganic peroxide and a brine solution with a mixture of a perhalogenated acetyl halide and a halogenated hydrocarbon while maintaining the temperature in the zone between 0° C. and the freezing temperature of the mixture, and continuously recovering a mixture of the perhaloacetyle peroxide and the halogenated hydrocarbon as a product of the process.

2. A process for the continuous preparation of a perhaloacetyl peroxide which comprises continuously countercurrently contacting in a contacting zone a mixture of an inorganic peroxide and a basic brine solution with a mixture of a perhalogenated acetyl halide and a halogenated hydrocarbon while maintaining the temperature in the zone between 0° C. and the freezing temperature of the mixture, and continuously recovering a mixture of the perhaloacetyl peroxide and the halogenated hydrocarbon as a product of the process.

3. A process for the continuous preparation of a perhaloacetyl peroxide which comprises continuously countercurrently contacting in a contacting zone a mixture of an inorganic peroxide and a basic brine solution with a mixture of a perhalogenated acetyl halide and a halogenated methane while maintaining the temperature in the zone between 0° C. and the freezing temperature of the mixture, and continuously recovering a mixture of the perhaloacetyl peroxide and the halogenated methane as a product of the process.

4. A process for the continuous preparation of a perhaloacetyl peroxide which comprises continuously countercurrently contacting in a contacting zone a mixture of hydrogen peroxide and a basic brine solution with a mixture of a perhalogenated acetyl halide and trichlorofluoromethane while maintaining the temperature in the zone between 0° C. and the freezing temperature of the mixture, and continuously recovering a mixture of the perhaloacetyl peroxide and trichlorofluoromethane as a product of the process.

5. A process for the continuous preparation of bis-trichloroacetyl peroxide which comprises continuously countercurrently contacting in a contacting zone a mixture of hydrogen peroxide and a basic brine solution with a mixture of trichloroacetyl chloride and trichlorofluoromethane while maintaining the temperature in the zone between 0° C. and the freezing temperature of the mixture, and continuously recovering a mixture of bis-trichloroacetyl peroxide and trichlorofluoromethane as a product of the process.

6. A process for the continuous preparation of a perhaloacetyl peroxide which comprises continuously countercurrently contacting in a contacting zone a mixture of an inorganic peroxide and a brine solution with a mixture of a perhalogenated acetyl halide and a halogenated hydrocarbon while maintaining the temperature in the zone between 0° C. and the freezing temperature of the mixture, and continuously recovering a mixture of the perhaloacetyl peroxide and the halogenated hydrocarbon as a product of the process.

7. A process for the continuous preparation of a perhaloacetyl peroxide which comprises continuously countercurrently contacting in a contacting zone a mixture of an inorganic peroxide and a basic brine solution with a mixture of a perhalogenated acetyl halide and a halogenated hydrocarbon while maintaining the temperature in the zone between 0° C. and the freezing temperature of the mixture, and continuously recovering a mixture of the perhaloacetyl peroxide and the halogenated hydrocarbon as a product of the process.

8. A process for the continuous preparation of a perhaloacetyl peroxide which comprises continuously countercurrently contacting in a contacting zone a mixture of an inorganic peroxide and a basic brine solution with a mixture of a perhalogenated acetyl halide and a halogenated methane while maintaining the temperature in the zone between 0° C. and the freezing temperature of the mixture, and continuously recovering a mixture of the perhaloacetyl peroxide and the halogenated methane as a product of the process.

9. A process for the continuous preparation of a perhaloacetyl peroxide which comprises continuously countercurrently contacting in a contacting zone a mixture of hydrogen peroxide and a basic brine solution with a mixture of a perhalogenated acetyl halide and trichlorofluoromethane while maintaining the temperature in the zone between 0° C. and the freezing temperature of the mixture, and continuously recovering a mixture of the perhaloacetyl peroxide and trichlorofluoromethane as a product of the process.

10. A process for the continuous preparation of bis-trichloroacetyl peroxide which comprises continuously countercurrently contacting in a contacting zone a mixture of hydrogen peroxide and a basic brine solution with a mixture of trichloroacetyl chloride and trichlorofluoromethane while maintaining the temperature in the zone between 0° C. and the freezing temperature of the mixture, and continuously recovering from the bottom of the contacting zone a mixture of bis-trichloroacetyl peroxide and trichlorofluoromethane as a product of the process.

11. A process for the continuous preparation of bis-trichloroacetyl peroxide which comprises introducing into the lower end of a vertically elongated reaction zone a mixture of hydrogen peroxide and a basic brine solution in continuous countercurrent flow to a mixture of trichloroacetyl chloride and trichlorofluoromethane while maintaining the temperature in the zone between 0° C. and the freezing temperature of the mixture, and recovering from the lower end of the reaction zone a mixture of bis-trichloroacetyl peroxide and trichlorofluoromethane as a product of the process.

References Cited in the file of this patent

UNITED STATES PATENTS

| | | |
|---|---|---|
| 1,913,775 | Straub | June 13, 1933 |
| 2,580,373 | Zimmerman | Dec. 25, 1951 |
| 2,700,662 | Young et al. | Jan. 25, 1955 |
| 2,771,492 | Chapman et al. | Nov. 20, 1956 |

FOREIGN PATENTS

| | | |
|---|---|---|
| 334,531 | Great Britain | Aug. 27, 1930 |